(12) United States Patent
Do et al.

(10) Patent No.: US 6,633,286 B1
(45) Date of Patent: Oct. 14, 2003

(54) METHOD AND APPARATUS FOR PROVIDING A MONITOR DEPLOYMENT

(75) Inventors: Ton Minh Do, Riverside, CA (US); John Portman, Anaheim, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 91 days.

(21) Appl. No.: 09/654,006

(22) Filed: Sep. 1, 2000

(51) Int. Cl.$^7$ ................................................ G05B 1/04
(52) U.S. Cl. .................. 345/205; 345/204; 345/214; 345/649; 345/659; 345/905; 348/825; 348/836; 348/837; 353/79; 362/233
(58) Field of Search .............................. 345/204, 205, 345/214, 649, 659, 905; 348/825, 836, 837; 353/79; 362/233

(56) References Cited

U.S. PATENT DOCUMENTS

| | | | | |
|---|---|---|---|---|
| 4,912,442 A | * | 3/1990 | Black ........................... 345/108 |
| 5,096,271 A | * | 3/1992 | Portman .................... 244/118.5 |
| 5,250,888 A | * | 10/1993 | Yu ............................... 248/919 |
| 5,526,245 A | * | 6/1996 | Davis et al. ................. 359/147 |
| 5,564,560 A | * | 10/1996 | Minelli et al. ............... 200/1 B |
| 5,625,980 A | * | 5/1997 | Teich et al. ..................... 49/25 |
| 5,848,485 A | * | 12/1998 | Anderson et al. ............. 37/348 |
| 6,348,928 B1 | * | 2/2002 | Jeong .......................... 345/649 |
| 6,384,875 B2 | * | 5/2002 | Bertagna ...................... 248/917 |
| 6,394,610 B2 | * | 5/2002 | Rodriguez, Jr. ............. 353/119 |

\* cited by examiner

*Primary Examiner*—Bipin Shalwala
*Assistant Examiner*—Vincent E. Kovalick
(74) *Attorney, Agent, or Firm*—Nathan O. Jensen; Kyle Eppele

(57) ABSTRACT

The present invention is a method and apparatus for providing a control system that controls at least one of a plurality of display units. In one embodiment, the control system includes a remote control circuit capable of activating a remote signal for moving the display unit between one of a first, a second and a third positions and another one of the first, the second and the third positions. The control system further includes a local display unit movement control circuit coupled to the display unit, and a transmitter coupled to the local display unit movement control circuit. The transmitter is configured to transmit a light beam capable of being reflected from a reflective surface near the transmitter to make a reflected light beam, and a receiver coupled to the local display unit movement control circuit. The receiver provides a signal to the local display unit control circuit upon detection of the reflected light beam to move the display unit between one of the first, the second and the third positions and another one of the first, the second and the third positions. Various embodiments are described.

20 Claims, 8 Drawing Sheets

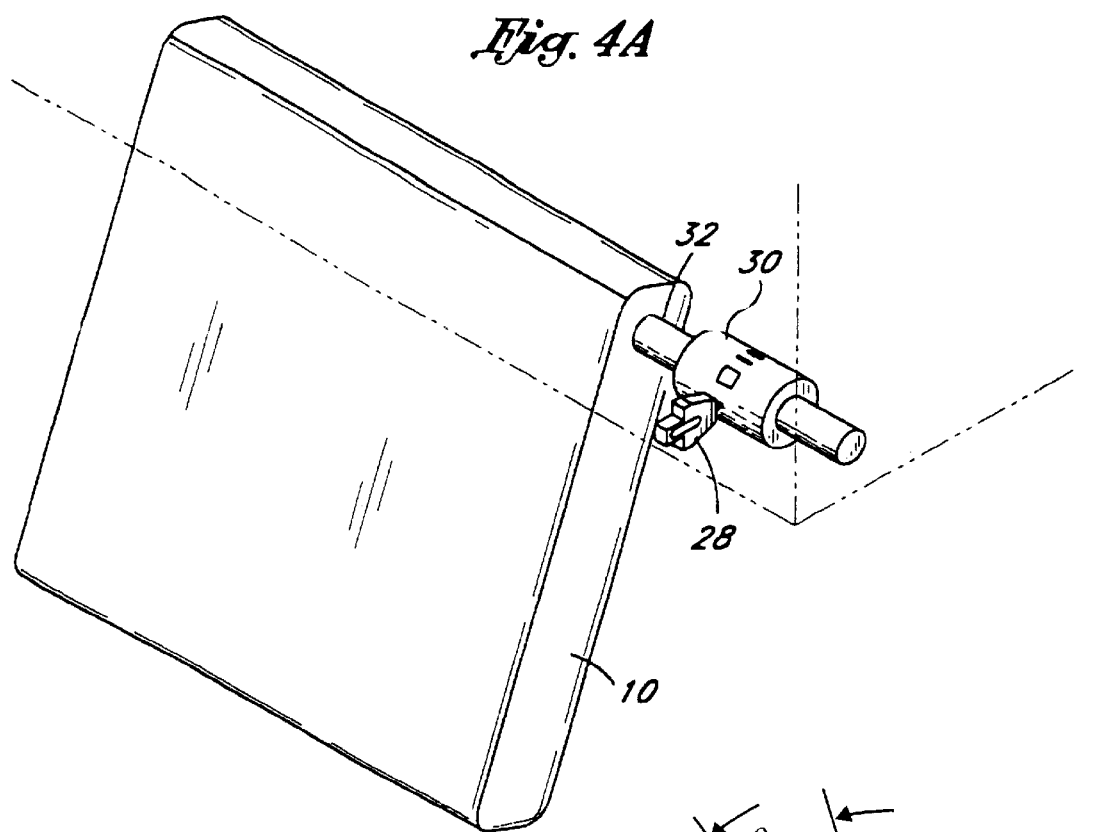
Fig. 4A
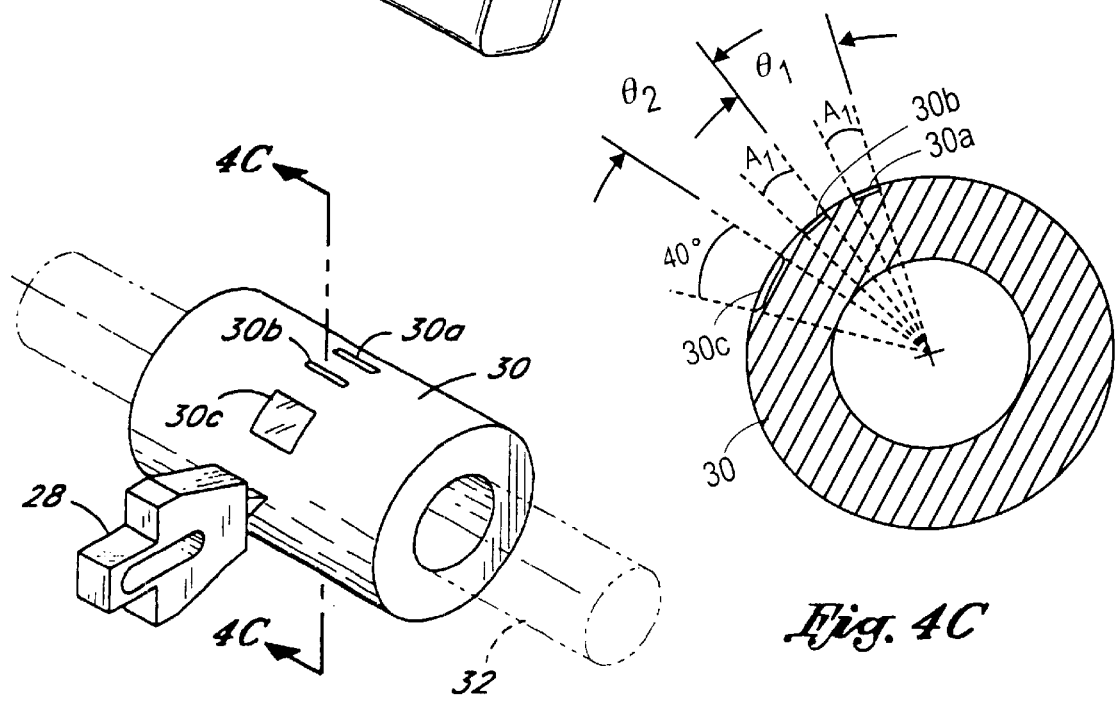
Fig. 4B
Fig. 4C

METHOD AND APPARATUS FOR PROVIDING A MONITOR DEPLOYMENT

BACKGROUND OF THE INVENTION

1. Field of the Invention

The present invention relates to the field of entertainment control systems. More particularly, the present invention relates to an entertainment control system for deploying one or more display units at one of a plurality of angles.

2. Description of Related Art

Over the last few decades, commercial aircraft have become a necessary mode of transportation for personal and business reasons. In order to improve passenger comfort, many commercial airlines have in-flight entertainment systems that include in-flight television display units for displaying movies and other programming. The display units are typically stowed in a cavity in the ceiling of the passenger cabin located above the passenger seats. Prior to viewing, the display units are typically deployed to an exposed position at a single, fixed angle with respect to the passenger cabin. Such single fixed deployment angles are often less than ideal.

As a result, viewing of the display screen by passengers is restricted. Moreover, when a liquid crystal display (LCD) screen is implemented within a display unit that is deployed at a non-optimal viewing angle, colors often appear dull. At times, the entire picture appears to be washed out, thus obscuring optimal viewing of the image.

It would therefore be desirable to have a vehicle entertainment control system that facilitates deployment of one or more display units at various angles between a maximum exposed position and a stowed position. Such a control system will facilitate flexible and optimal viewing of displayed images.

SUMMARY OF THE INVENTION

The present invention is a method and apparatus for providing a control system that controls at least one of a plurality of display units. In one embodiment, the control system includes a remote control circuit capable of activating a remote signal for moving the display unit between one of a first, a second and a third positions and another one of the first, the second and the third positions. The control system further includes a local display unit movement control circuit coupled to the display unit, and a transmitter coupled to the local display unit movement control circuit. The transmitter is configured to transmit a light beam capable of being reflected from a reflective surface near the transmitter to make a reflected light beam, and a receiver coupled to the local display unit movement control circuit. The receiver provides a signal to the local display unit control circuit upon detection of the reflected light beam to move the display unit between one of the first, the second and the third positions and another one of the first, the second and the third positions. Various embodiments are described.

BRIEF DESCRIPTION OF THE DRAWINGS

The objects, features and advantages of the present invention will become apparent from the following detailed description of the present invention in which:

FIG. 4A illustrates a rear perspective view of one embodiment of the deployment assembly provided in accordance with the principles of the present invention.

FIG. 4B illustrates an enlarged view of the sensor wheel 30 of FIG. 6A.

FIG. 4C is a cross section of one embodiment of the sensor wheel 30 of FIG. 4B.

DETAILED DESCRIPTION OF THE PREFERRED EMBODIMENT

The present invention relates to a vehicle entertainment control system having deployment assembly for moving one or more display units between a plurality of exposed positions and a stowed position, the vehicle entertainment system preferably being implemented during in-flight. In the preferred embodiment, the display unit is a liquid crystal display ("LCD") monitor. As discussed herein, a "vehicle" may include, but is not limited to, an aircraft, train, ferry, bus, or any other mode of mass transit. For clarity, the present invention will be described during implementation within a commercial aircraft. Throughout the detailed description, a number of illustrative embodiments are described in order to convey the spirit and scope of the present invention. While numerous specific details are set forth to describe the preferred embodiment of the invention, such details may not be required to practice the present invention.

Figure 1:
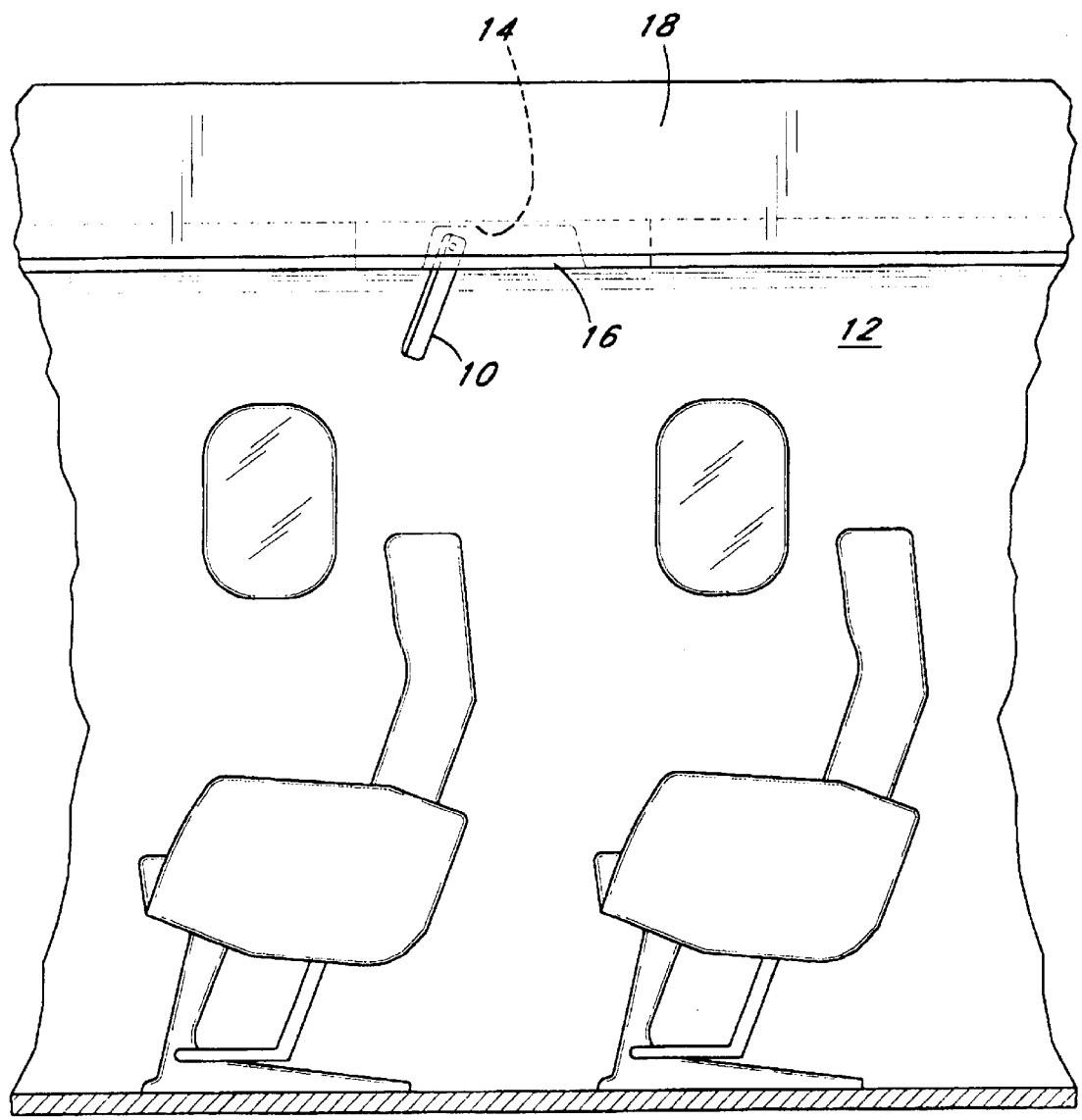
FIG. 1 illustrates a display unit assembled into a passenger cabin of an aircraft.

FIG. 1 illustrates a display unit or monitor 10 assembled into a passenger cabin 12 of an aircraft. Referring to FIG. 1, a frame 14 is mounted into a ceiling cavity 16 of a cabin overhead 18 above the passenger seating area for stowing a display unit. Although FIG. 1 shows only one display unit, the passenger cabin 12 includes a plurality of such display units. Normally, the display units 10 are placed in a stowed position, parallel with the frame 14. During viewing of programming such as a movie, the display units 10 are moved into an exposed position. In the embodiment of FIG. 1, the display units 10 are pivotally coupled to the frame 14. However, in a first alternative embodiment, the display units 10 are placed in the cabin overhead 18 perpendicular to the frame 14 when in the stowed position and moved down vertically (either automatically or manually) until they are viewable by passengers. In a second alternative embodiment, the display units 10 are placed outside the ceiling cavity 16 positioned at an angle with respect to the frame 14 when in the stowed position. With respect to the embodiment of FIG. 1, the display units 10 are spaced apart every three rows of seats, so that they are viewable by the passengers.

Figure 2:
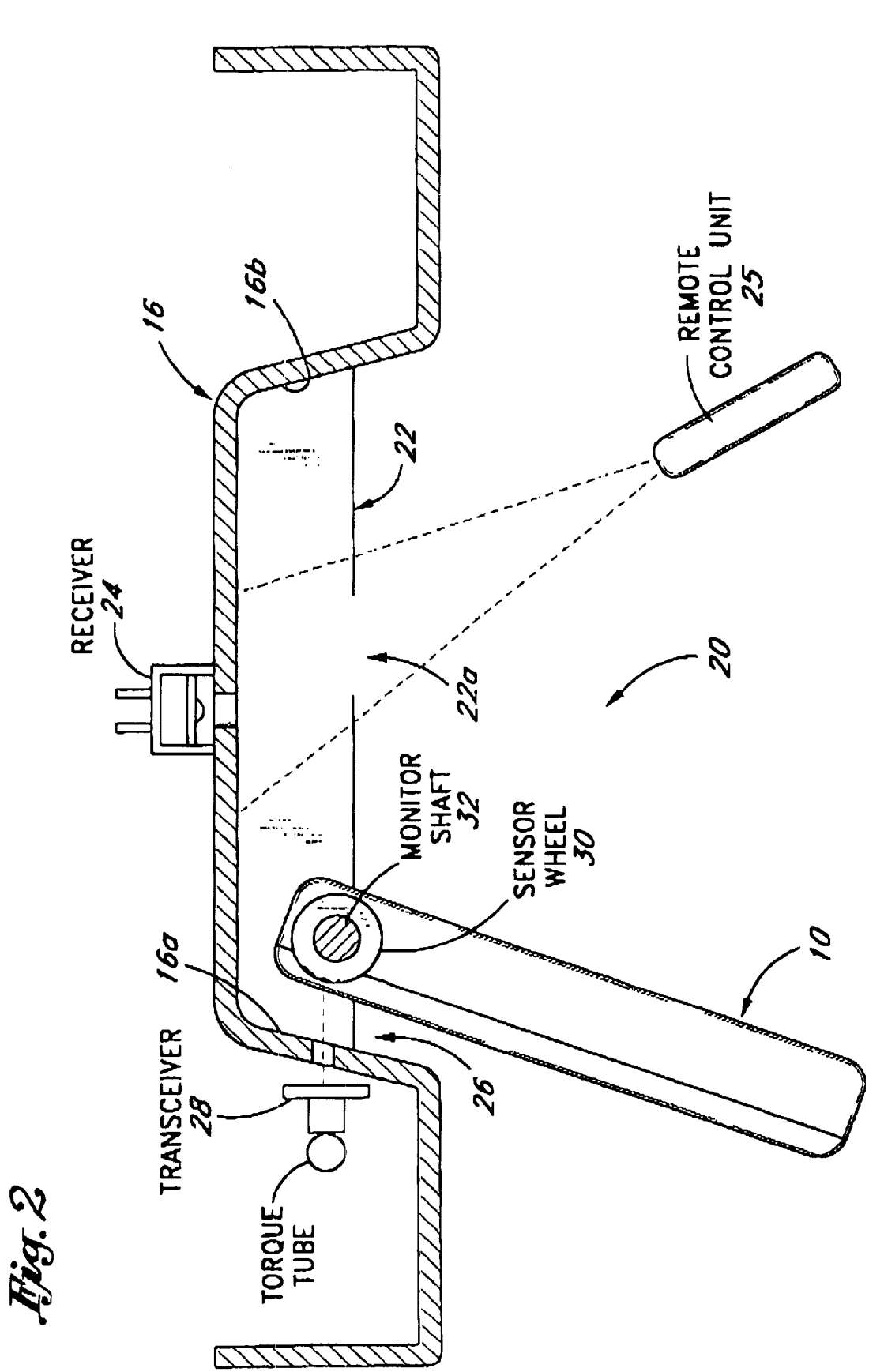
FIG. 2 illustrates a side view of a display unit typically installed in a passenger cabin overhead of an aircraft.

FIG. 2 illustrates a side view of a display unit 10 typically installed in a passenger cabin overhead 18 of an aircraft. Referring to FIG. 2, the display unit 10 is moved between a stowed position and one of a plurality of exposed positions under the control of a deployment assembly 20. Alternatively, the display unit 10 may be moved between a plurality of exposed positions under the control of the deployment assembly 20.

As discussed earlier, the display unit 10 is typically installed in the passenger cabin overhead 18 of an aircraft. In one embodiment, a retract surface 22 is located below the bottom side of the cabin overhead 18. The retract surface 22 has an aperture 22a for operating the deployment assembly 20 via a receiver 24. In one embodiment, the receiver 24 is an infrared IR receiver. In one embodiment, the receiver 24 is mounted on the inside of 25 the cabin overhead 18, and may be controlled from the passenger seating area. In one embodiment, the deployment assembly 20 may be activated via the receiver 24 using a remote control unit 25. The ceiling cavity 16 below the passenger cabin overhead 18 has two side walls 16a and 16b. The side wall 16a located on the back side of the display unit 10 includes an aperture 26 for monitoring the deployment angle of the display unit 10 via a transceiver 28. In one embodiment, the transceiver is an infrared (IR) transceiver. In a further embodiment, the transceiver 28 includes a photodiode that transmits an IR beam, and a photodetector that detects the reflected IR beam. In particular, a sensor wheel 30 having a plurality of calibration marks (see FIG. 4) may be implemented to facilitate deployment of the display unit 10 at a corresponding plurality of deployment angles. In one embodiment, the calibration marks are reflective.

Figure 3:
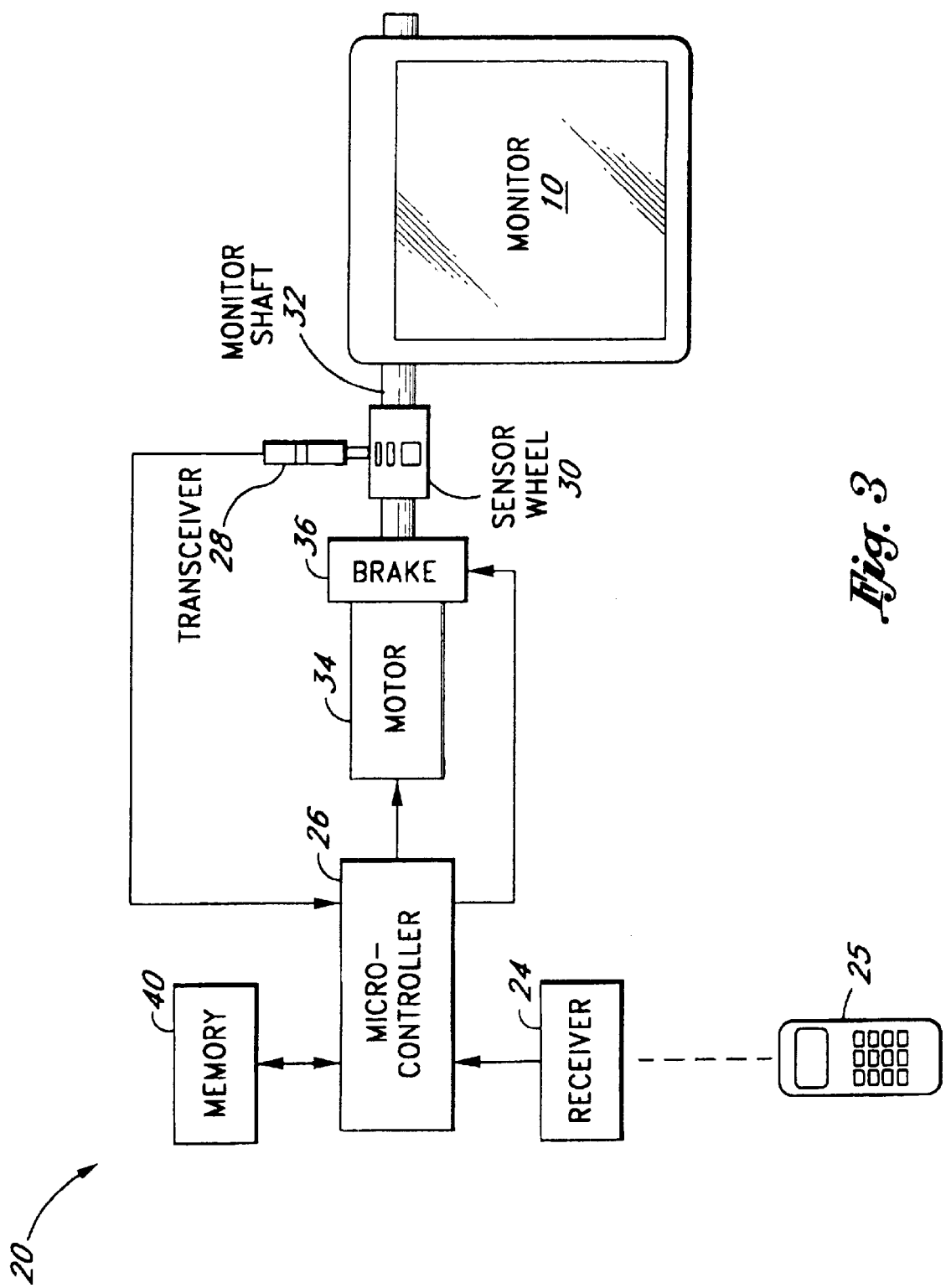
FIG. 3 is a system block diagram of one embodiment of the deployment assembly of FIG. 2.

FIG. 3 is a system block diagram of one embodiment of the deployment assembly 20 of FIG. 2. The deployment assembly 20 comprises receiver 24 that receives control information from the remote controller 25, a micro-controller 26, the transceiver 28 that receives control information from the sensor wheel 30 located on the pivoting monitor shaft 32 of the display unit 10. In alternative embodiments, the micro-controller 26 may be any control unit, including, but not limited to, processors. The pivoting monitor shaft 32 is coupled to a motor 34 and a brake 36 that is also coupled to the pivoting monitor shaft 32. During deployment, as the display unit 10 rotates about a longitudinal axis of the pivoting monitor shaft 32. The sensor wheel 30 located on the pivoting monitor shaft 32 also rotates along the same axis and in the same direction as the pivoting monitor shaft 32. Based on information provided from the receiver 24 and/or the transceiver 28, the micro-controller 26 generates deployment control signals to the motor 34 and brake 36, which subsequently control the movement of the display unit 10. The deployment positions of the monitor 10 may be pre-calibrated and stored in memory 40, as discussed in detail in the following sections.

FIG. 4A illustrates a rear perspective view of one embodiment of the deployment assembly 20 provided in accordance with the principles of the present invention. FIG. 4B illustrates an enlarged view of the sensor wheel 30 of FIG. 4A, and FIG. 4C is a cross section of one embodiment of the sensor wheel 30 of FIG. 4B. As shown, the sensor wheel 30 has a plurality of calibration marks 30a, 30b, and 30c, each of which is capable of reflecting light emitted from the transceiver 28. In one embodiment, the first two calibration marks 30a and 30b, are narrow calibration marks, and each provides a predetermined detection angle $A_1$ for the transceiver 28. In one embodiment, the predetermined detection angle $A_1$ is 5 to 10 degrees. The angular distance $\theta_1$ between the first and second calibration marks 30a and 30b, is predetermined to provide known reference points to the micro-controller 26 for calibration of the motor speed. In one embodiment, $\theta_1$ is 35°–45°. The angular distance $\theta_2$ between the second and third calibration marks 30b and 30c is also predetermined. In one embodiment, $\theta_2$ is in the range 20°–30°.

The third calibration mark 30c has a detection angle that provides a deployment angle of $(A_2-X)$ degrees to $(A_2+X)$ degrees, where X is a predetermined tolerance. In one embodiment, $A_2$ is 20° and X is 10 degrees. The deployment range (i.e., $A_2+2X$) of the third calibration mark 30c enables the micro-controller 26 to determine if the position of the display Unit 10 is within acceptable limits.

In an alternate embodiment, the transceiver 28 may be mounted on the pivoting monitor shaft 32 in place of the sensor wheel 30. In this embodiment, the transceiver 28 may be configured to reflect light off an object or target that has a fixed position with respect to the transceiver 30. To facilitate deployment of the display unit 10 at multiple angles, the object or target may comprise reflective calibration marks similar to the calibration marks 30a, 30b and 30c.

To calibrate the deployment assembly 20, the micro-controller 26 first measures the time taken between detection of the first and the second calibration marks 30a and 30b. Since the positions of the calibration marks 30a, 30b and 30c are known, the measured time may then used to determine the deployment speed of the display unit 10. Once the deployment speed has been determined, the micro-controller 26 waits until it detects the start of the third calibration mark 30c. Once it detects the third calibration mark 30c, the micro-controller 26 will wait for the required amount of time for the display unit 10 to travel from the starting angle of the third calibration mark 30c to the desired deployment angle. At that juncture, the micro-controller 26 will engage the brake 36 and shut off the motor 34, so as to stop the display unit 10 at the desired viewing angle.

By measuring the amount of time between detection of the first and second calibration marks 30a and 30b, the display unit deployment speed is calibrated, ensuring consistent deployment results among all display units. By measuring the amount of time after the detection of the third mark 30c, any number of different angles within the angular definition provided by the detection angle $(A_2+2X)$ of the third calibration mark 30a may be selected. In one embodiment, the micro-controller 26 may be programmed to provide viewing of the display Unit 10 at increments of 5°.

Once configured, the deployment assembly 20 may be used. To actuate the deployment assembly 20, the user selects from one of a plurality of positions for desired viewing of the display unit 10. In one embodiment, the remote controller 25 may be configured to issue signals corresponding to deployment of the display unit 10 at predetermined deployment angles, starting from an initial position. For example, by pressing a deployment button once, the display unit 10 may be deployed at a 100 degree angle. By pressing the deployment button again, the display unit 10 may be deployed at increments of 5 degrees, up to a final deployment position. In the present example, where $(A_2+2X)=40°$, eight deployment positions may be available, e.g., if the initial deployment angle is 100°, the other deployment positions are at 105°, 110°, 115°, 120°, 125°, 130° and 135°. It is apparent to one of ordinary skill in the art that a greater number of deployment positions, each having different deployment angles, may be configured for operation of the display unit 10.

Once the deployment position has been selected, the remote controller 25 (see FIG. 3) generates a signal that is received by the receiver 24 to deploy the display unit 10. The receiver 24 subsequently forwards a signal to the micro-controller 26, which releases the brake 36 and actuates the motor 34 to rotate the monitor shaft 32. At the same time, the transceiver 28 monitors the sensor wheel 30 to determine the deployment position of the display unit 10. This is accomplished by generating a light beam that is reflected off the sensor wheel 30. Upon detection of the corresponding calibration mark, the transceiver 28 issues a signal to the micro-controller 26, which applies the brakes 36 and suspends operation of the motor 34. The display unit 10 is then held in the desired viewing position.

Figure 5:
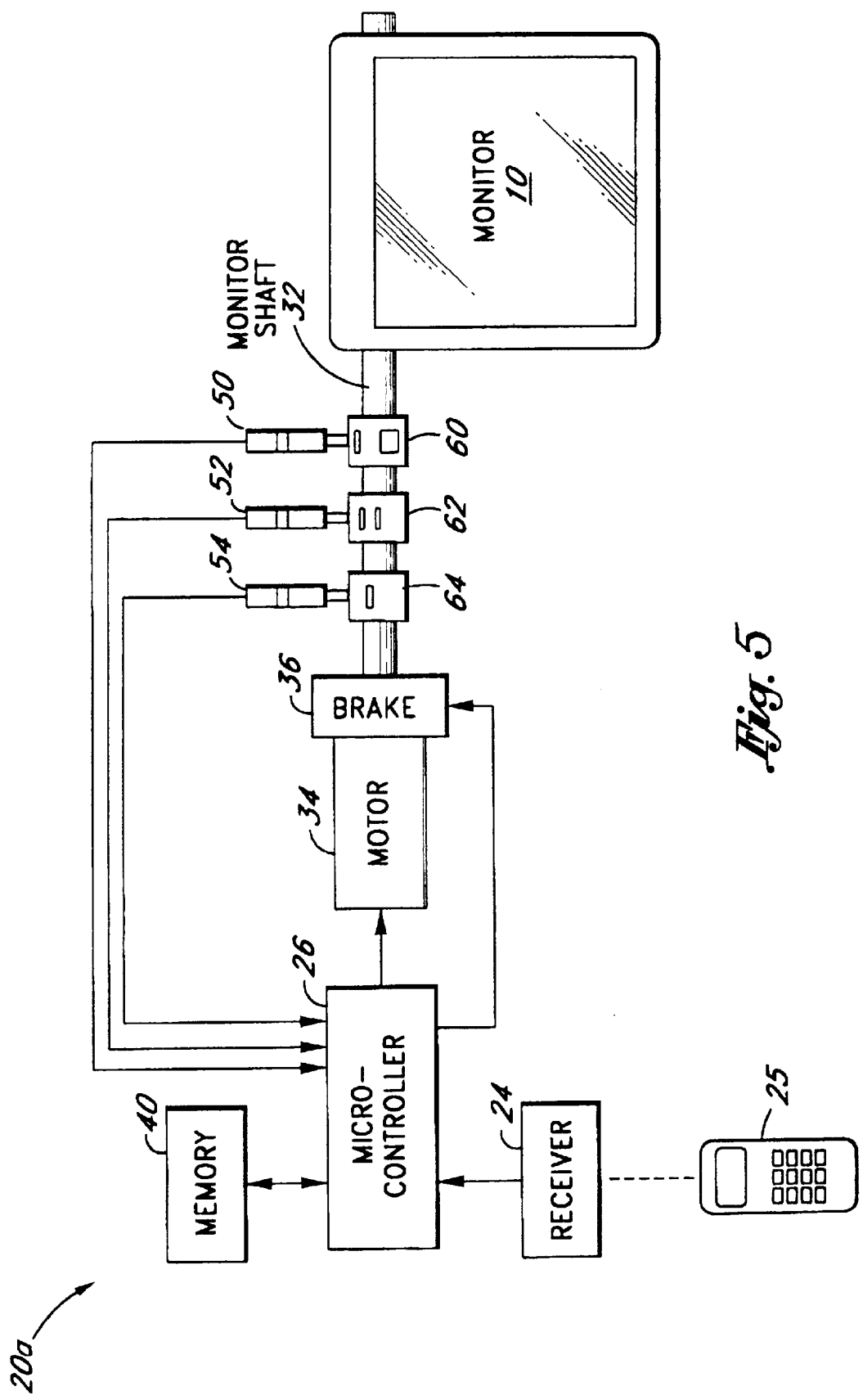
FIG. 5 is a system block diagram of a second embodiment of the deployment assembly of FIG. 2.

FIG. 5 is a system block diagram of an alternate embodiment of the deployment assembly 20 of FIG. 2. As shown in FIG. 5, the deployment assembly 20a is substantially similar to the deployment assembly 20 with the exception that the deployment assembly 20a comprises a plurality of transceivers 50, 52, 54, instead of a single transceiver 28 (as shown in FIGS. 3 and 4A–C), and a plurality of sensor wheels 60, 62, 64, instead of a single sensor wheel 30 (as shown in FIGS. 3 and 4A–C). In one embodiment, the transceivers 50, 52 and 54 are IR transceivers.

Figure 6A:
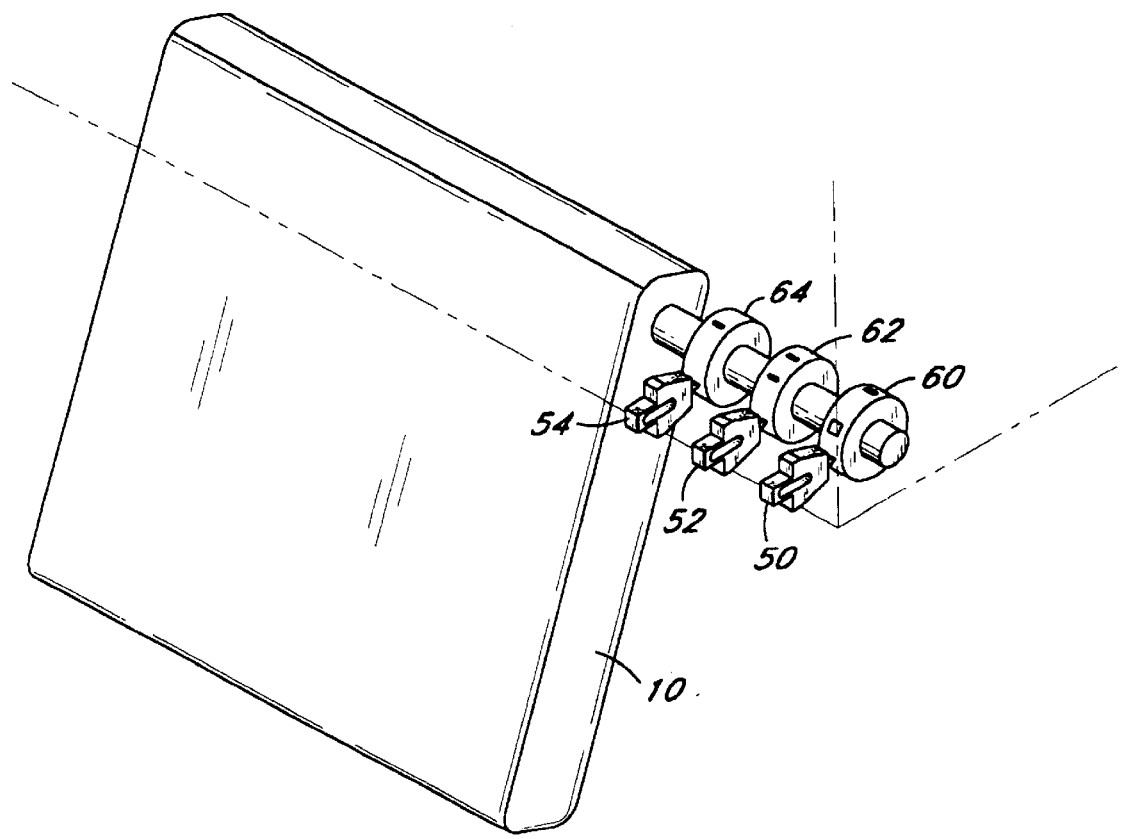
FIG. 6A illustrates a rear perspective view of the deployment assembly of FIG. 5 provided in accordance with the present invention.
Figure 6B:
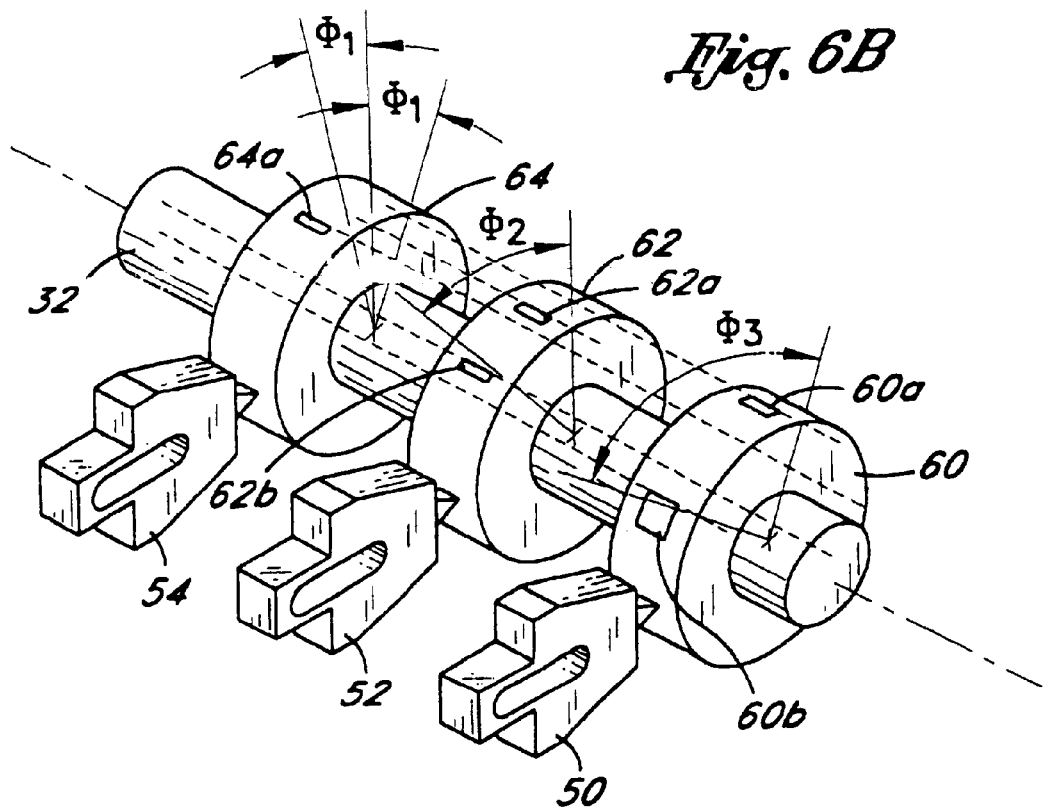
FIG. 6B is a detailed perspective view of the sensor wheels 60, 62 and 64 of FIG. 6A.
Figure 6C:
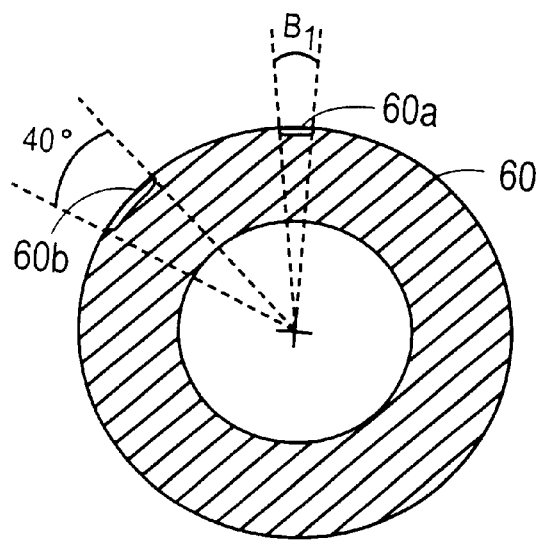
FIG. 6C is a cross section of one embodiment of the sensor wheel 60 of FIG. 6B.

FIG. 6A illustrates a rear perspective view of another embodiment of the deployment assembly provided in accordance with the present invention. FIG. 6B is a detailed perspective view of the sensor wheels 60, 62, and 64 of FIG. 6A. As shown in FIG. 6A and 6B, each sensor wheel 60, 62 and 64 has one or more calibration marks 60a, 62a–b and 64a. Each calibration mark 60a, 62a–b and 64a is offset from every other calibration mark. In one embodiment, the calibration mark 60a is offset from the first calibration mark 62a of the second sensor wheel 62 by a predetermined angle $\Phi_1$; the calibration mark 60a is also offset from the first calibration mark 64a of the third sensor wheel 64 by a predetermined angle $2\Phi_2$. In one embodiment, $\Phi_1=7°$. The first and second calibration marks 62a and 62b of the second sensor wheel are offset by a predetermined angle $\Phi_2$. In one embodiment, $\Phi_2=15°$. In one embodiment, $\Phi_3=30°$. The sensor wheels 60, 62, and 64 are all mounted on the pivoting monitor shaft 32, and the calibration marks 60a, 62a–b and 64a on each of the wheels 60, 62 and 64 are monitored by respective transceivers 50, 52, and 54. FIG. 6C is a section of the sensor wheel 60 of FIG. 6B. In one embodiment, the calibration marks 60a, 62a–b and 64a are of the same width or detection angle. In particular, the first calibration mark 60a provides a predetermined detection angle $B_1$ for the transceiver 50. Similarly, the first and second calibration marks 62a and 62b each provides a predetermined detection angle $B_1$ for the transceiver 52. In one embodiment, the predetermined detection angle $B_1$ for the transceiver 50 or 52 is 5 to 10 degrees. The second mark 60b is a reflective position that is a landing zone for the deployed position of sensor wheel 60. In one embodiment, the angle is 40°.

The positions of the calibration marks 60a, 62a–b and 64a, along with the time taken to travel from a first to a second calibration mark, e.g. from 60a to 62a, may be used to calculate the deployment speed of the display unit 10, as discussed above.

To calibrate the deployment assembly 20a, the micro-controller 26 first measures the time taken between detection of the calibration mark 60a of the first sensor wheel and the calibration mark 62a of the second sensor wheel 62. Since the positions of all the calibration marks 60a, 62a–b and 64a are known, the measured time may be used to determine the deployment speed of the display unit 10. Once the deployment speed has been determined, the micro-controller 26 can determine the time at which the final deployed position will be reached. Depending upon the signal or signals issued by the remote controller 25, the micro-controller 26 may then engage the display unit 10 at positions corresponding to the calibration marks 64a, 62b. In addition, the micro-controller 26 may be further programmed to deploy the display unit 10 at predetermined increments, such as at every 5° upon detection of the start of the calibration mark 60b of the first sensor wheel 60. For example, the initial deployment position corresponding to the start of the detection of the calibration mark 60b is 95°, the other deployment positions of the display unit 10 based on the detected deployment speed of the display unit 10, may be programmed at a 5° interval to provide deployment positions of 100°, 105°, 110°, 115°, 120°. Once configured, the display unit 10 may be deployed in a manner similar to that of the deployment assembly 20.

Alternatively, the deployment assembly 20a may be pre-calibrated, and transceiver 50, 52, and 54 may be programmed to direct light towards the respective calibration marks 60a, 62a–b and 64a to detect the deployment positions of the deployment unit 10. For example, the transceivers 50, 52, and 54 may each direct a beam of light towards the respective sensor wheel 60, 62, 64. In one embodiment, the beam of light is an IR light beam. When light is reflected off the first calibration mark 60a on the first sensor wheel, the micro-controller 26 determines that the first deployment position of the display unit 10 has been reached and the brake 36 may be engaged to stop the display unit 10 at that position. If the user indicates that the display unit 10 should be displayed at the second deployment position, the pivoting shaft 32 rotates until a light is reflected off the second calibration mark 62b of the second sensor wheel 62 and detected by the transceiver 52. At this juncture, the micro-controller 26 determines that the second deployment position of the display unit 10 has been reached. Micro-controller 26 may then engage the display 10 in the second deployment position by applying the brake 36.

Similarly, to engage the display unit 10 at the third deployment position, light is directed from the third transceiver 54 toward the third sensor wheel 64. Then, when light is reflected off the first calibration mark 64a of the third sensor wheel, the micro-controller 26 determines that the third deployment position of the display unit 10 has been reached, and may the apply brake 36. Likewise, to engage the display unit 10 at the fourth deployment position, light is directed from the second transceiver 52 toward the second sensor wheel 62. The, when light is reflected off the second calibration mark 62b, the micro-controller 26 determines that the fourth deployment position of the display unit 10 has been reached, and may then apply brake 36. The fifth deployment position of the display unit 10 may be reached by detecting the second calibration mark 60b of the first sensor wheel 60.

Figure 7A:
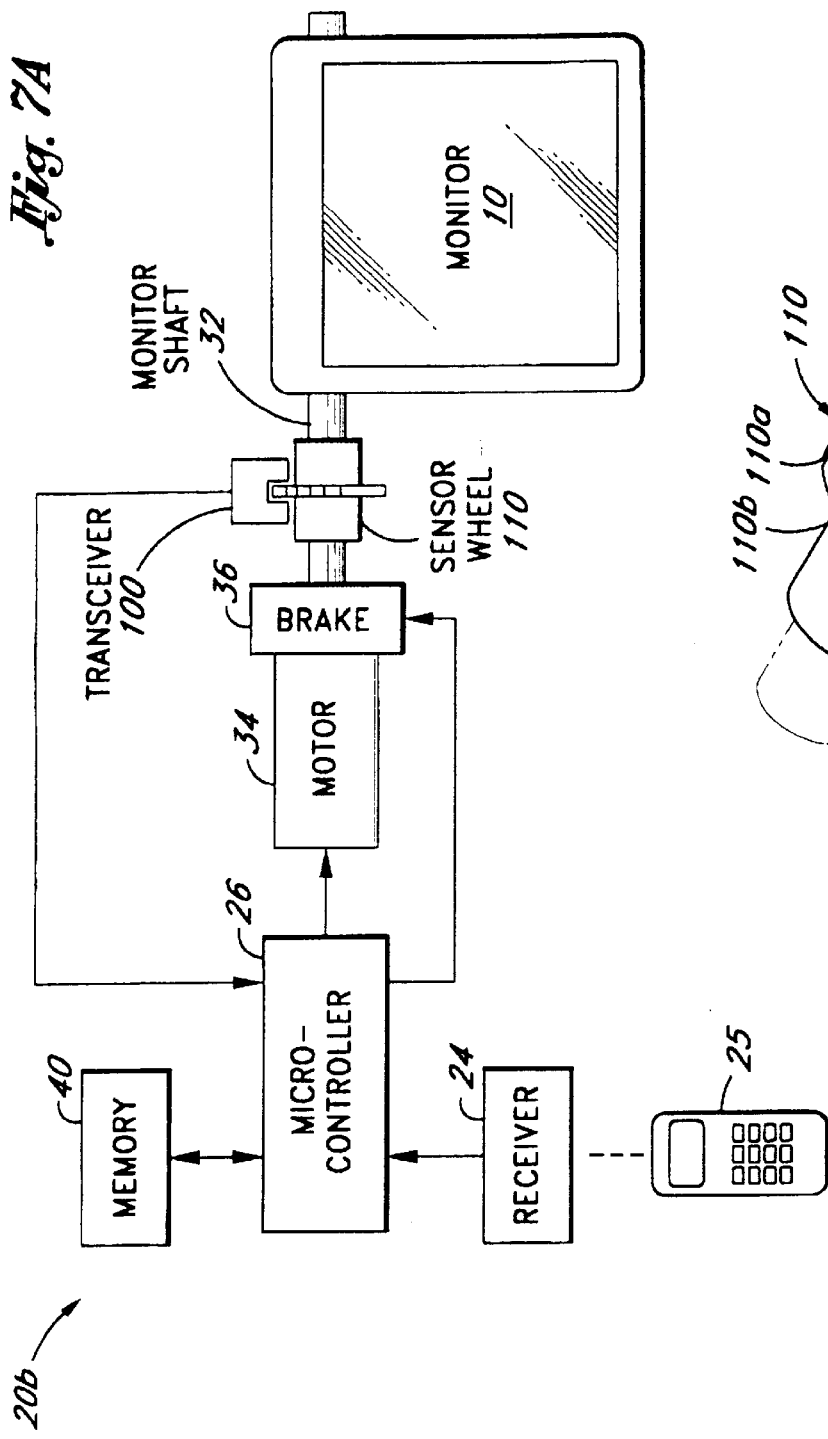
FIG. 7A is a system block diagram of a third embodiment of the deployment assembly of FIG. 2.
Figure 7B:
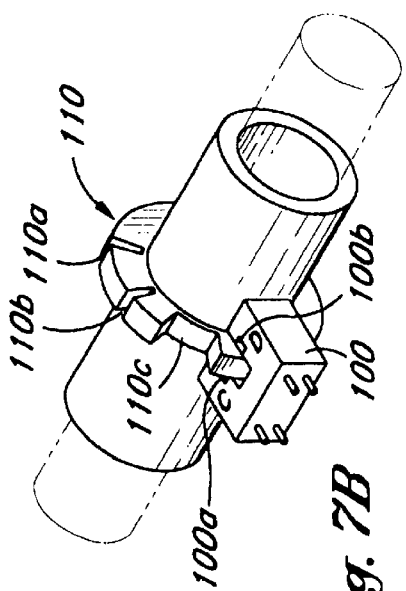
FIG. 7B illustrates a rear perspective view of the deployment assembly of FIG. 7A provided in accordance with the present invention.

FIG. 7 is a system block diagram of a third embodiment of the deployment assembly of FIG. 2. As shown in FIG. 7, the deployment assembly 20b is substantially similar to the deployment assembly 20 with the exception that the transceiver 100 includes a transmitter 100a located at position C and a detector 100b located at position D; and the sensor wheel 110 includes a plurality of slots 110a, 110b and 110c. In one embodiment, the transmitter is a photodiode that transmits IR beam, while the receiver is a photodetector that detects the IR beam. In one embodiment, the slots 110a and 110b have the same width, and the slot 110c is substantially wider than either of the slots 110a and 110b. In a further embodiment, the width of the slots 110a and 110b are 5° while the width of the slot 110c is 40°. In operation, light is transmitted from the transmitter 100a towards the receiver 100b. However, the light is blocked by the sensor wheel 110 when the monitor is not located at a corresponding deployment position. When light is transmitted from transmitter 100a across the slot 110a and received by the detector 100b, the micro-controller 26 detects that the monitor 10 has reached the first timing position. It then measures the time the period it takes to travel from between the first and second timing positions by determining the time it takes to detect light transmitted through the slot 110b as received by detector 100b. Since the locations of the slots 110a and 110b are known and since the time taken for the monitor 10 to travel from the first timing position to the second timing-position may then be calculated, the deployment speed of the monitor 10 may also be determined. The micro-controller 26 may then determine the time it takes to reach the deployment position after passing the first edge of the opening 110c and, at the time, may apply the brake 36 to hold the display unit in one or more desired viewing positions, in the same manner as described for the deployment assembly 20 of FIG. 3.

The present invention thus facilitates the deployment of one or more display units at various angles between a maximum exposed position and a stowed position. Such a control system will provide flexibility in the passenger's viewing of the display unit.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A deployment assembly for a display unit, comprising:
    a remote control unit capable of activating a remote signal for moving the display unit to a desired deployment position;
    a display unit movement control unit coupled to the display unit;
    a transceiver coupled to said display unit movement control unit, said transceiver configured to transmit a light beam capable of being reflected from a reflective surface near said transceiver to make a reflected light beam wherein said reflective surface is one of a first, a second and a third calibration mark; and
    said transceiver providing a signal to said display unit control unit upon detection of said reflected light beam to move said display unit to the desired deployment position.

2. The deployment assembly of claim 1, wherein said display unit movement control unit measures the time taken between detection of the first and second calibration marks to determine display unit deployment speed, waits until the start of the third calibration mark, and then waits a required amount of time for the display to move to the desired deployment position in accordance with the display movement speed.

3. The deployment assembly of claim 2, wherein said desired deployment position is one of a first, a second and a third position corresponding to said first, said second and said third calibration marks.

4. The deployment assembly of claim 3, wherein said desired deployment position is the third position said third position comprising a plurality of deployment angles.

5. The deployment assembly of claim 4, wherein said reflective surface is located on one of a first, a second and a third sensor wheels said sensor wheels being located on a pivoting shaft that is coupled to said display unit movement control circuit.

6. The deployment assembly of claim 4, wherein said reflective surface is located on a sensor wheel said sensor wheel is located on a pivoting shaft that is coupled to said display unit movement control circuit.

7. The deployment assembly of claim 1, wherein said display unit comprises:
    a pivoting shaft that is coupled to said display unit movement control circuit, said pivoting shaft having a first sensor wheel and a second sensor wheel, said first sensor wheel having a first and second reflective surface, said second sensor wheel having a third reflective surface; and wherein said transceiver includes a first transceiver and a second transceiver, said first transceiver transmits a first light beam toward said first sensor wheel, said second transceiver transmits a second light beam toward said second sensor wheel, one of said first or second transceivers sending a signal to said display unit control upon detection of a reflected light beam to move said display between one of a first, second and third positions.

8. The deployment assembly of claim 7, wherein detection of light reflected from the first, second and third reflective surfaces corresponds to the first, the second and the third deployment positions.

9. A method of moving a vehicle entertainment system display unit to a desired deployment position said desired deployment position being one of a first, a second and a third position, comprising:
    providing a light beam;
    reflecting said light beam off a reflective surface;
    detecting said reflected light beam;
    providing a signal to a vehicle entertainment system display unit controller; and
    moving the vehicle entertainment system display unit to the desired deployment position wherein said desired deployment position is selected from the group consisting of a stowed position and a plurality of exposed positions.

10. The method of claim 9 wherein reflecting said light beam includes reflecting said light beam off a reflective surface of a sensor wheel located on a pivoting shaft coupled to the display unit wherein said reflective surface is one of a first, a second and a third calibration mark located on the sensor wheel.

11. The method of claim 10 wherein the system display unit controller further performs the steps comprising:
    measuring time taken between detection of the first calibration mark and detection of the second calibration mark;
    determining deployment speed of the display unit;
    detecting the third calibration mark;
    waiting a required amount of time after detection the third calibration mark; and
    stopping the display unit at the desired deployment position.

12. The method of claim 10, wherein in the act of reflecting said light beam, said first, second and third calibration marks correspond to said first, said second and said third positions.

13. The method of claim 9, further comprising reflecting first, second and third light beams off a first, second and third reflective surface of a first, a second and a third sensor wheels, each of said sensor wheels being located on a pivoting shaft coupled to the display unit.

14. The method of claim 13, wherein said first, said second and said third reflective surface correspond to a corresponding calibration mark respectively located on said first, said second and said third sensor wheels.

15. The method of claim 14, wherein providing a light beam comprises providing an IR light beam.

16. A display unit movement control circuit for a vehicle entertainment system for moving a display unit, comprising:
   a controller coupled to the display unit;
   a photodiode coupled to said controller, said photodiode configured to transmit a light beam capable of being reflected from a reflective surface near said photodiode to make a reflected light beam;
   a photodetector coupled to said controller, said photodetector capable of detecting said reflected light beam, and said photodetector providing a signal to said controller for moving the display unit between one of a first, a second and a third position in response to detecting said reflected light beam; and
   a pivoting shaft on said display unit said pivoting shaft having a sensor wheel, said pivoting shaft being coupled to said controller, wherein said reflective surface is located on said sensor wheel.

17. The circuit of claim 16, wherein said light beam is in the IR frequency range.

18. A deployment assembly for a display unit, comprising:
   a remote control unit capable of activating a remote signal for moving the display unit between one of a first, a second and a third positions and another one of the third positions;
   a display unit movement control circuit coupled to the display unit;
   a transceiver coupled to said display unit movement control circuit, said transceiver comprising a transmitter and a receiver configured to transmit a light beam capable of being transmitted to said receiver;
   a pivoting shaft coupled to said display unit movement control circuit, said pivoting shaft having a sensor wheel with a first, a second and a third slot wherein light transmitted by said transmitter is received by said receiver when said light travels through any one of said first, said second, and said third slots; and
   said receiver providing a signal to said display unit control circuit upon detection of said transmitted light to move said display unit between one of the first, the second and the third positions and said another one of the third positions.

19. The deployment assembly of claim 18, wherein detection of light traveling through said first, said second and said third slots, by said receiver corresponds to a first, a second and a third deployment position of said display unit.

20. The deployment assembly of claim 18, wherein said light is an IR light beam.

* * * * *